(12) United States Patent
Mielke

(10) Patent No.: US 8,518,223 B2
(45) Date of Patent: Aug. 27, 2013

(54) METHOD AND APPARATUS FOR FORMING BY ELECTROCHEMICAL MATERIAL REMOVAL

(75) Inventor: Rainer Mielke, Oberursel (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 12/289,281

(22) Filed: Oct. 23, 2008

(65) Prior Publication Data

US 2010/0025233 A1 Feb. 4, 2010

Related U.S. Application Data

(62) Division of application No. 10/733,768, filed on Dec. 12, 2003, now Pat. No. 7,462,273.

(30) Foreign Application Priority Data

Dec. 17, 2002 (DE) .................................. 10 258 920

(51) Int. Cl.
*B23H 3/02* (2006.01)
*B23H 9/10* (2006.01)
*B23H 3/04* (2006.01)

(52) U.S. Cl.
USPC .................... 204/229.4; 204/224 M; 205/651

(58) Field of Classification Search
USPC .......................... 204/224 M, 229.4; 205/651
See application file for complete search history.

(56) References Cited

U.S. PATENT DOCUMENTS

| | | | |
|---|---|---|---|
| 4,213,834 A | 7/1980 | Semashko et al. | |
| 4,257,865 A | 3/1981 | Semashko et al. | |
| 4,323,749 A | 4/1982 | Mazond et al. | |
| 4,491,712 A | 1/1985 | Ito | |
| 4,628,173 A | 12/1986 | Ito | |
| 4,851,090 A | 7/1989 | Burns et al. | |
| 4,948,488 A | 8/1990 | Tsymbal et al. | |
| 4,999,093 A | 3/1991 | Moracz | |
| 5,038,012 A | 8/1991 | Walter | |
| 6,542,843 B1 | 4/2003 | Metzinger et al. | |
| 6,835,299 B1 | 12/2004 | Tchugunov | |

FOREIGN PATENT DOCUMENTS

| | | |
|---|---|---|
| DE | 2903873 | 8/1979 |
| DE | 3036134 | 4/1981 |
| DE | 3135918 | 6/1982 |
| DE | 3922913 | 1/1991 |
| DE | 3829363 | 8/1991 |
| EP | 0292213 | 11/1988 |
| EP | 1 249 294 A2 | 10/2002 |
| JP | 2002292524 A | 10/2002 |
| WO | WO 02072303 | 9/2002 |

*Primary Examiner* — Nicholas A Smith
(74) *Attorney, Agent, or Firm* — Timothy J. Klima; Shuttleworth & Ingersoll, PLC

(57) ABSTRACT

When forming metallic components, in particular three-dimensionally curved blades, which constitute a single piece with the blading of turbomachine rotor wheels, the linear oscillation of the electrode acting as a tool is superimposed by a circular oscillation, enabling the electrode to turn into the workpiece conformally with its shape. Further forming is performed by circular oscillation with circular feed in the one and/or the other direction. An embodiment of the corresponding apparatus comprises an electrode holder (9) with linear feed (Zvor) and linear oscillation (Zosz) and a workpiece holder (5) with circular oscillation (Cosz) and circular feed (Cvor).

22 Claims, 4 Drawing Sheets

METHOD AND APPARATUS FOR FORMING BY ELECTROCHEMICAL MATERIAL REMOVAL

This application claims priority to German Patent Application DE10258920.8 filed Dec. 17, 2002, the entirety of which is incorporated by reference herein. This application is a divisional of, and claims priority to, U.S. patent application Ser. No. 10/733,768, filed Dec. 12, 2003, now U.S. Pat. No. 7,462,273, the entirety of which is incorporated by reference herein.

BACKGROUND OF THE INVENTION

This invention relates to a method and apparatus for the forming of components of complex shape, in particular turbomachine rotor wheels, which constitute a single piece with the blading, by electrochemical material removal.

As is known, the complex, three-dimensionally curved contours of blades of one-piece rotor wheels for fans, compressors and turbines made from a solid, for example the blisk-technology rotor wheels of jet engines, are produced by milling the solid with a cutting tool. Due to the heavy curvature of these blades and the complex shape of the space between the blades, the geometries of these blades are unsuitable for production in flank contact. The only way to produce these shapes is machining in point contact. However, this method is extremely cost and time-consuming and, therefore, lends itself only to a limited extent to the series-production of, for example, compressor disks in blisk technology. In addition, the surfaces are textured by the point-contact milling process and must, therefore, be ground after milling in a subsequent operation.

Also, the repair of a rotor wheel, where damaged blades or blade sections are to be replaced or corrected by mold welding, build-up welding or the like, requires costly remachining of the item under repair by a cutting process.

A generally known forming process by material removal, as described in Specification DE 29 03 873 for example, is based on the electrochemical machining of the workpiece, with a suitably shaped electrode oscillating linearly shortly above the electrolyte-wetted workpiece surface and removing material conformally with the shape of the electrode as the latter is transversed linearly. Electrochemical material removal is effected in the so-called ECM (electrochemical machining) and PEM (precise electrochemical machining) processes such that a voltage pulse is applied to the linearly oscillating electrode when its distance to the electrolyte-wetted workpiece is minimum. The more advanced PEM process, which is free from electrode wear and thermal affection of the workpiece, is characterized by high machining precision and surface finish.

Specification U.S. Pat. No. 4,999,093 already proposed the use of the apparently advantageous electrochemical forming for the manufacture of turbine blades or other components with three-dimensionally curved contour. The apparatus described therein is, however, unsuitable for the production of one-piece rotor wheels where the blades are machined from a solid, for example blisk-technology rotor wheels, since it does not provide for the complex, three-dimensionally curved contour of the space to be produced between adjacent blades.

BRIEF SUMMARY OF THE INVENTION

The present invention, in a broad aspect, provides for a method for the electrochemical machining of workpieces which also enables components of complex shape, in particular one-piece turbomachine rotor wheels with curved blades made from a solid, to be produced and repaired with low effort, and for the development of an appropriate apparatus for the performance of said method.

It is a particular object of the present invention to provide solution to this problem by the features described herein. Further objects and advantages of the present invention will be apparent from the description below.

The principle underlying the method for electrochemical machining of workpieces in accordance with the present invention is that the electrode or the workpiece perform a circular oscillation synchronously with their linear oscillation, enabling a complexly contoured electrode, for example in the shape of a three-dimensionally curved compressor blade, to virtually turn into the workpiece with minimum material removal. The further forming process until the precise space width and blade shape are obtained is then performed without linear oscillation, merely by subsequent circular oscillation in combination with circular feed in the one and/or the other direction of rotation. Thus, complexly shaped items, such as integral, three-dimensionally curved blades and, accordingly, one-piece turbine wheels (so-called blisks) can be produced or repaired by electrochemical machining with maximum precision and surface finish and free from material stress, obviating any further processing to smoothen the surface as is necessary with the known processes for the production of blisks, and significantly reducing manufacturing and repair cost.

A further, important feature of the present invention, for example for the production of compressor wheels, is that, by means of the above method, a conventionally made sample workpiece is used as an electrode to produce, by electrochemical material removal, a workpiece-negative electrode which acts as a working electrode in the further process, with this working electrode initially being lowered into a blank and then finally forming the blades by subsequent circular oscillation.

The synchronous linear and circular movements can be performed by the electrode (electrode holder) or the workpiece to be machined (workpiece holder) or by both, the workpiece and the electrode.

In the series production of compressor wheels, the electrode preferably performs linear movements, while the workpiece preferably performs circular movements.

Also, the method can advantageously be applied for the repair of compressor disks and compressor drums. In this case, the rotary movement, i.e. the circular oscillation and the circular feed of the disk or drum respectively, is accomplished around an axis that is vertical to the linear movement of the electrode. Furthermore, the electrode is transversable in the X and Y-axes.

BRIEF DESCRIPTION OF THE DRAWINGS

The present invention is more fully described in the light of the accompanying drawings showing an embodiment. In the drawings.

DETAILED DESCRIPTION OF THE INVENTION

Figure 9:
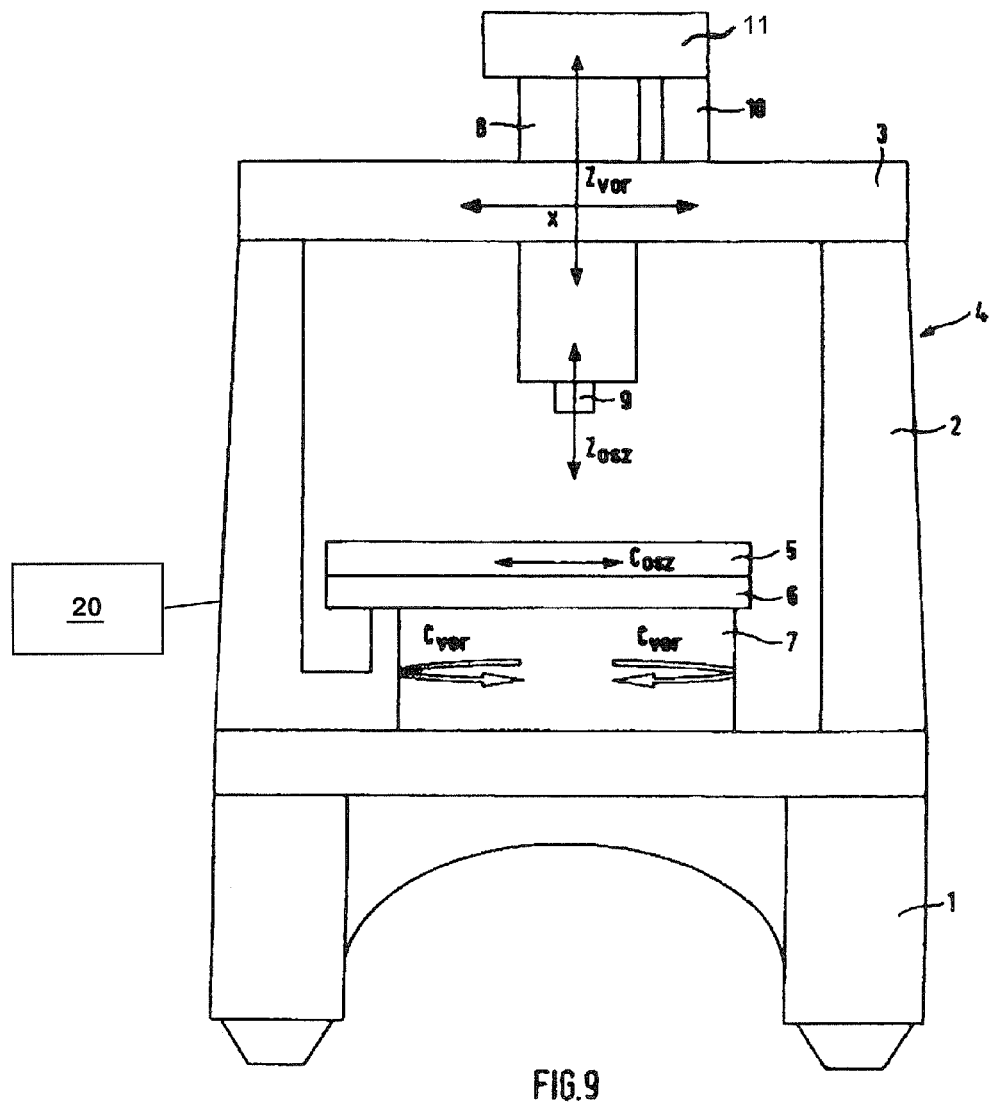
FIG. 9 is a schematic view of an apparatus with superimposed circular oscillation/feed around a vertical axis for the production of complexly shaped components by electrochemical material removal to the PEM process.

The apparatus according to FIG. 9 comprises a machine casing 4 consisting of a base 1, side members 2 and a gantry 3. The base 1 carries a workpiece holder 5, i.e. a work table, which holds the workpiece (not shown) to be processed. The work table/workpiece holder 5 is connected to a rotary-oscillation drive 6 (first drive) in order to set the work table 5 and, thus, the workpiece to be machined in circular oscillation (arrow $C_{osz}$) around a vertical center axis. A rotary-feed drive 7 (second drive), which is connected to the rotary-oscillation drive 6, provides a linear horizontal circular feed (arrow $C_{vor}$) of the workpiece holder 5 in either direction simultaneously with the circular oscillation.

A tool slide 8 with electrode holder 9 is arranged on the machine gantry 3 and is transversable in the direction of the double arrow X. The electrode holder 9, which is linearly moveable in the tool slide 8, is capable of performing a linear oscillation (double arrow $Z_{osz}$) and a linear vertical feed (double arrow $Z_{vor}$) which superimposes the linear oscillation and, for this purpose, is also connected to a (third and fourth) drive 10 effecting the linear feed and the linear oscillation movement. Horizontal feed of the tool slide 8 is effected by a fifth drive.

The operation of the above apparatus and the inventive method performed by means of this apparatus are explained as-follows by way of the example of the manufacture of a one-piece compressor rotor wheel (blisk of an engine) in connection with the FIGS. 1 to 8.

In a first process step, a sample workpiece 12, here a compressor rotor wheel with circumferentially arranged blades 12a, is produced from an inexpensive, electrically conductive material using a conventional, machining process. For clarity, FIG. 1 to 8 show only part of the tool or workpiece with three blades 12a each. Depending on the size of the component to be manufactured and the capacity of the PEM equipment available, the sample workpiece 12 can be a complete model of the final component such that the complete component is machined simultaneously or can only be a portion, for example in the shape of a sector, such that the component is machined sequentially, for instance, three blades at a time.

Figure 1:
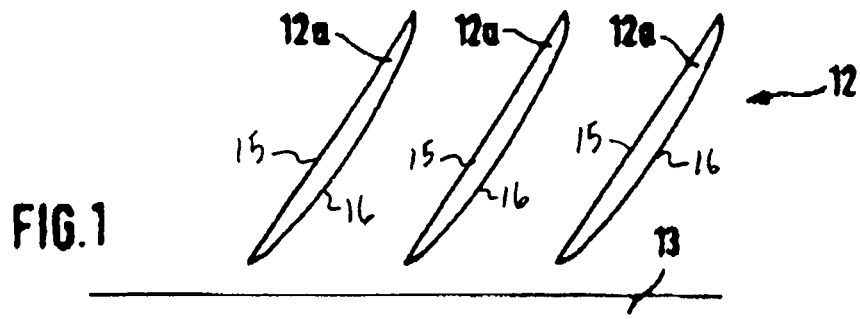
FIG. 1 to 8 are simplified, schematic representations of the individual process steps according to the present invention for the production of the blade row of a compressor wheel, with the illustration showing, in development, only a certain sector of the tool and of the workpiece or the blade row, respectively.

Subsequently, the sample workpiece 12 (12a) made in the electrically conductive material is mounted to the electrode holder 9, while a blank electrode 13 (blank in an electrode material, for example brass) is located on the work table 5 underneath (ref. FIG. 1). The perspective seen in FIGS. 1-4 is the same as seen in FIG. 9, so that the blades 12a and blank electrode 13 are being seen from an outer circumferential edge. In the schematic representations shown in FIGS. 1-4, the blades 12a are not shown as being interconnected but in practice, they are connected to and extend radially from a center hub portion that is mountable to the electrode holder 9.

Figure 2:
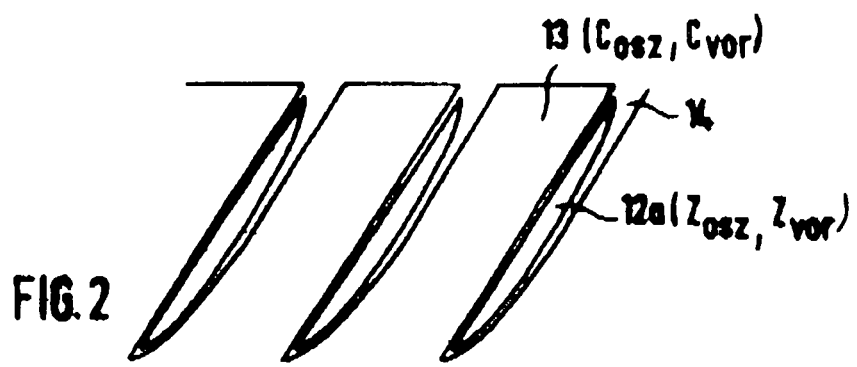

In the following step 2, see FIG. 2, the sample workpiece 12 (i.e. the individual blades 12a) which now serves as an electrode (sample electrode) and which is set in linear oscillation $Z_{osz}$ is lowered into the blank electrode 13 which is in circular oscillation $C_{osz}$. By providing the sample workpiece 12 with gradual vertical feed $Z_{vor}$ while simultaneously providing the blank electrode 13 with a calculated amount of circular feed $C_{vor}$, the blades 12a can enter the blank electrode 13 at a desired diagonal angle from the top of the blank electrode 13 while electrochemically removing material from the blank electrode 13. (FIG. 2).

Figure 3:
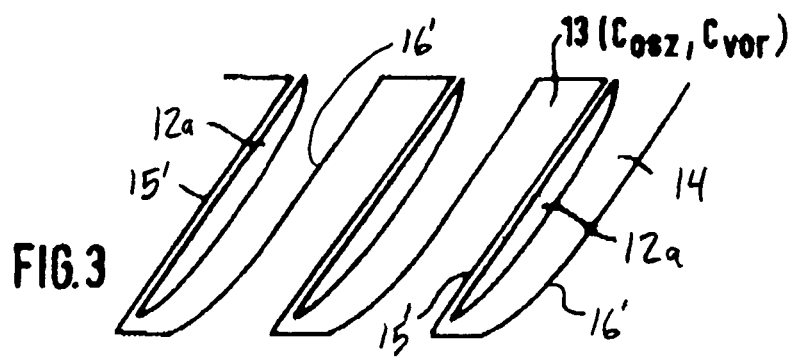

In the next process step 3 according to FIG. 3, the reverse form 15' of the pressure side 15 of the blades 12a of the sample workpiece 12 is first produced in the recesses 14 of the blank electrode 13 by circular oscillation $C_{osz}$ and simultaneous horizontal circular feed $C_{vor}$ (to the right in the drawing) of the blank electrode 13.

Figure 4:
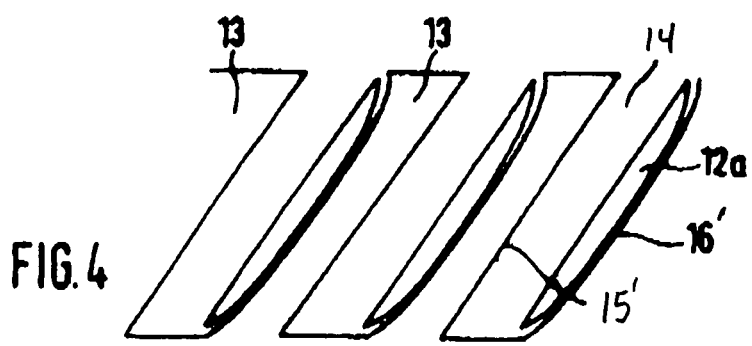

As shown in FIG. 4, the horizontal circular feed $C_{vor}$ is then reversed so that the blank electrode 13 is moved to the left in step 4, with circular oscillation $C_{osz}$ being maintained, to produce the reverse form 16' of the suction side 16 of the blades 12a in the recesses 14 of the blank electrode 13.

Figure 5:
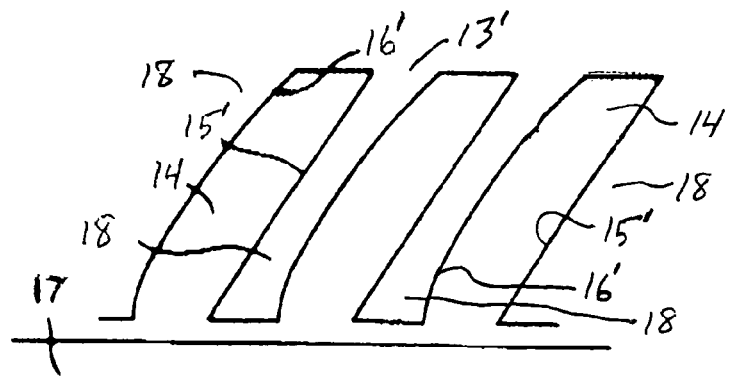

FIG. 5 shows the new electrode, or working electrode 13', produced from the blank electrode 13 in the above steps 1 to 4 for a series production by PEM of components whose shape conforms to the afore-mentioned sample workpiece 12. The working electrode 13' shown in FIGS. 5-8 is the same as the finished blank electrode 13 shown in FIG. 4. The working electrode 13' is the perfect negative (reverse) of the sample workpiece 12 in terms of the shape of the pressure and suction sides of the blades 12a, but not in terms of the wall thickness.

For series production, the working electrode 13' is now inverted and mounted to the electrode holder 9 of the apparatus described in FIG. 9 and a blank 17 is clamped to the work table 5 to produce, in the desired shape, by electrochemical material removal, items such as compressor disks (blisks) from an aerospace or difficultly machineable material in a simple, rapid and precise manner.

Figure 6:
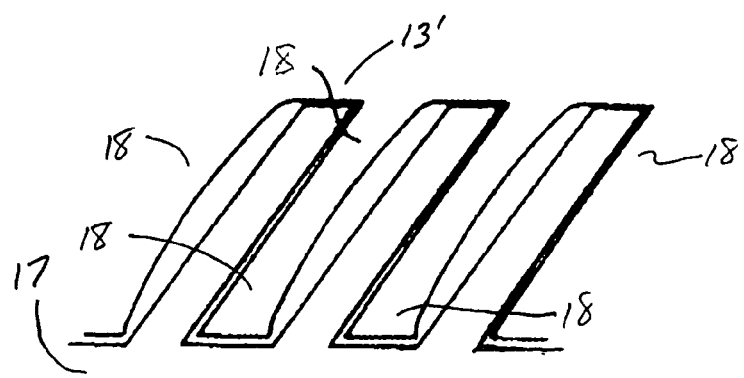
Figure 7:
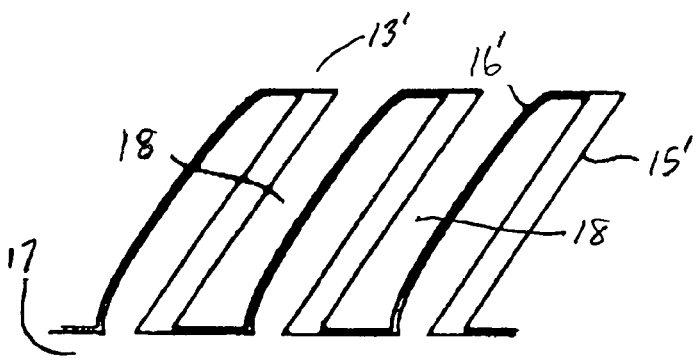
Figure 8:
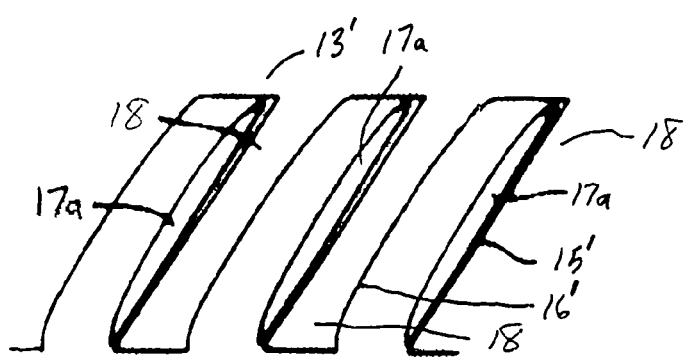

In a fifth process step according to FIG. 6, ribs 18 are initially formed on the blank 17, as a blade prestage, by simultaneous linear oscillation $Z_{osz}$ of the working electrode 13' (by electrode holder 9) and circular oscillation $C_{osz}$ of the blank 17 (by work table 5). As in the production of the blank electrode 13 discussed above in step 2, the working electrode 13' is also provided with a gradual vertical feed $Z_{vor}$ while simultaneously providing the blank 17 with a calculated amount of circular feed $C_{vor}$ so the ribs 18 can enter the blank 17 at a desired diagonal angle from the top of the blank 17 while electrochemically removing material from the blank 17. In two further process steps (6 and 7), the blades 17a are then finish-formed to their precise wall thickness and three-dimensionally curved shape by maintaining the circular oscillation $C_{osz}$ of the blank 17 and with gradual circular feed $C_{vor}$ of the blank 17 initially in the one direction (FIG. 7, step 6) and subsequently in the opposite direction of rotation (FIG. 8, step 7).

For series production, the process steps 5 to 7 illustrated in FIG. 5 to 8 are repeated as often as appropriate to produce compressor disks (blisks) with highest manufacturing accuracy, but with drastically lower time consumption and work compared with known milling methods.

The method described above in the light of FIGS. 1 to 8 and the corresponding apparatus shown in FIG. 9, whose essential feature is that the linear oscillation with linear feed is superimposed by a circular oscillation with circular feed in either direction, allows blade rows, or sections thereof, or individual blades, for example replaced or repaired blades, to be formed or finish-formed within closest tolerance ranges by electrochemical material removal according to the PEM process. Such method and operations are controlled by a programmable controller 20 and controller programming of the PEM machine. Moreover, the method described in the example lends itself also to the production of complexly shaped components in other applications, which formerly were not electrochemically machineable as workpiece areas were not accessible by the electrode. In certain applications (component forming), the linear oscillation can also be performed separately from the circular oscillation in that the electrode first enters the workpiece exclusively by linear oscillation and then continues the workpiece forming process exclusively by circular oscillation in a direction vertical to the linear machining movement. Similarly, the present invention is not limited to the exemplified relationship of the respective oscillation and feed movements. For example, the linear and circular oscillation and/or the linear and circular feed can be performed exclusively by the electrode.

Figure 10:
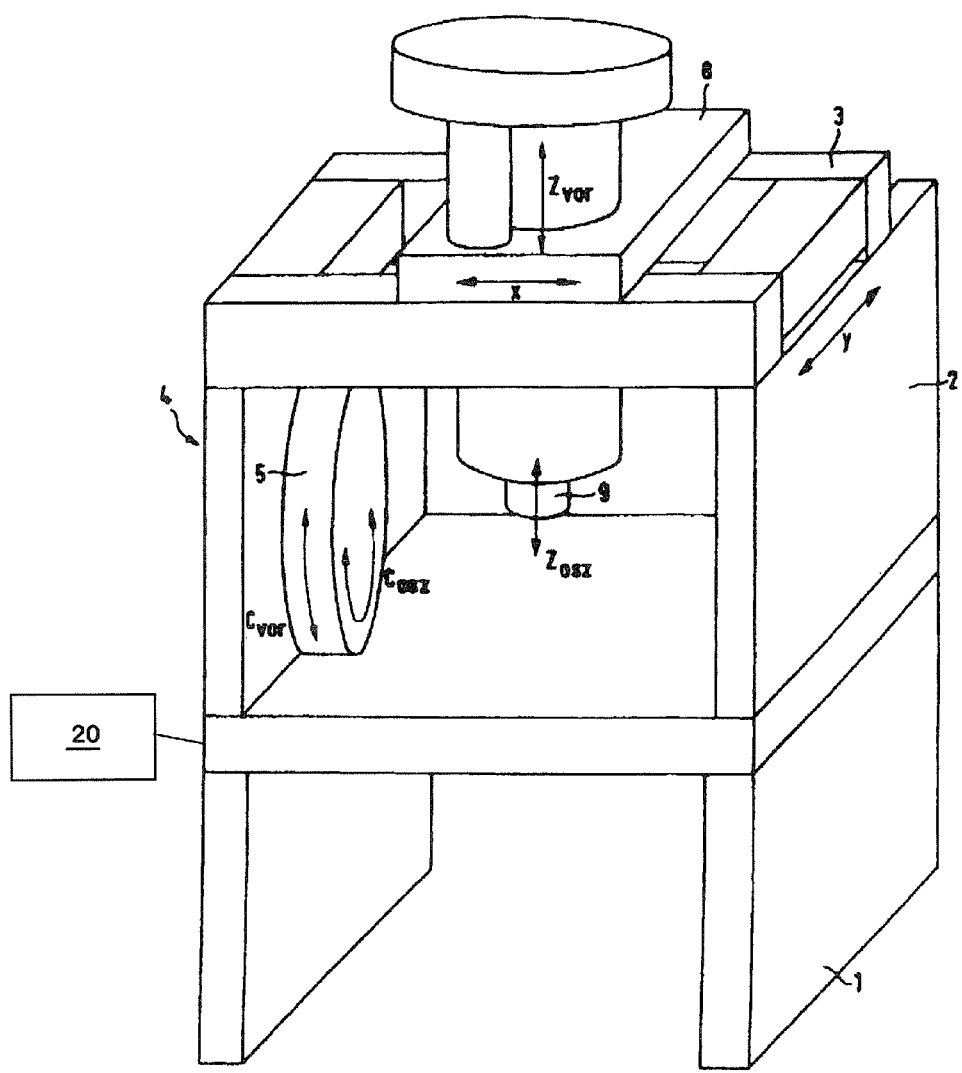
FIG. 10 is a representation of the apparatus according to FIG. 9, however with circular oscillation/feed around a horizontal axis.

FIG. 10 shows a variant of the apparatus represented in FIG. 9 where, for the forming or repair of individual blades on a rotor wheel or a drum consisting of several, adjacent rotor wheels, the tool slide 8 is transversable on the machine gantry 3 in both the X direction and the Y direction and where the circular oscillation $C_{osz}$ and the circular feed $C_{vor}$ are performed around a horizontal axis in which the drum to be machined is located.

What is claimed is:

1. An apparatus for forming components of complex shape, comprising:
   a workpiece holder for holding a component to be machined,
   an electrode holder for holding an electrode used to machine the component,
   at least one circular drive for simultaneously driving at least one of the workpiece holder and the electrode holder with respect to the other in a circular oscillation and at least one of the workpiece holder and the electrode holder with respect to the other in a circular feed,
   a third drive for driving at least one of the workpiece holder and the electrode holder with respect to the other in a linear oscillation, and
   a fourth drive for driving at least one of the workpiece holder and the electrode holder with respect to the other in a linear feed,
   an operative connection between the at least one circular drive, the third drive and the fourth drive for operating the at least one circular drive, the third drive and the fourth drive to provide the circular feed and the linear feed simultaneously with at least one of the circular oscillation and the linear oscillation, the operative connection including a programmable controller and programming for the programmable controller.

2. An apparatus in accordance with claim 1, wherein the at least one circular drive is associated with the workpiece holder and the third and the fourth drive are associated with the electrode holder.

3. An apparatus in accordance with claim 2, wherein the at least one circular drive includes a first drive for providing the circular oscillation and a second drive for providing the circular feed.

4. An apparatus in accordance with claim 1, wherein the at least one circular drive is associated with the electrode holder and the third and the fourth drive are associated with the workpiece holder.

5. An apparatus in accordance with claim 4, wherein the at least one circular drive includes a first drive for providing the circular oscillation and a second drive for providing the circular feed.

6. An apparatus in accordance with claim 1, wherein at least one of the electrode holder and the workpiece holder are transversable in at least one of the X direction and the Y direction.

7. An apparatus in accordance with claim 1, wherein the circular oscillation and the circular feed are performed around an axis that is essentially parallel to a linear oscillation axis.

8. An apparatus in accordance with claim 1, wherein the circular oscillation and the circular feed are performed around a linear oscillation axis.

9. An apparatus in accordance with claim 1, wherein the at least one circular drive includes a first drive for providing the circular oscillation and a second drive for providing the circular feed.

10. An apparatus in accordance with claim 1, wherein both the workpiece holder and the electrode holder are moved with a simultaneous circular feed and linear feed.

11. An apparatus in accordance with claim 1, wherein both the workpiece holder and the electrode holder are moved with a circular oscillation.

12. An apparatus in accordance with claim 1, wherein both the workpiece holder and the electrode holder are moved with a linear oscillation.

13. An apparatus in accordance with claim 1, wherein the simultaneous circular feed and linear feed operate simultaneously with both the circular oscillation and the linear oscillation.

14. An apparatus for forming components of complex shape, comprising:
   a workpiece holder for holding a component to be machined;
   an electrode holder for holding an electrode used to machine the component;
   at least one circular drive for simultaneously driving at least one of the workpiece holder and the electrode holder with respect to the other in a circular oscillation and at least one of the workpiece holder and the electrode holder with respect to the other in a circular feed;
   a third drive for driving at least one of the workpiece holder and the electrode holder with respect to the other in a linear oscillation; and
   a fourth drive for driving at least one of the workpiece holder and the electrode holder with respect to the other in a linear feed;
   an operative connection between the at least one circular drive, the third drive and the fourth drive for operating the at least one circular drive, the third drive and the fourth drive to provide the circular feed and the linear feed simultaneously with at least one of the circular oscillation and the linear oscillation, while also moving the workpiece holder and the electrode holder simultaneously, the operative connection including a programmable controller and programming for the programmable controller.

15. An apparatus in accordance with claim 14, wherein the at least one circular drive is associated with the workpiece holder and the third and the fourth drive are associated with the electrode holder.

16. An apparatus in accordance with claim 15, wherein the at least one circular drive includes a first drive for providing the circular oscillation and a second drive for providing the circular feed.

17. An apparatus in accordance with claim 14, wherein the at least one circular drive is associated with the electrode holder and the third and the fourth drive are associated with the workpiece holder.

18. An apparatus in accordance with claim 17, wherein the at least one circular drive includes a first drive for providing the circular oscillation and a second drive for providing the circular feed.

19. An apparatus in accordance with claim 14, wherein at least one of the electrode holder and the workpiece holder are transversable in at least one of the X direction and the Y direction.

20. An apparatus in accordance with claim 14, wherein the circular oscillation and the circular feed are performed around an axis that is essentially parallel to a linear oscillation axis.

21. An apparatus in accordance with claim 14, wherein the circular oscillation and the circular feed are performed around a linear oscillation axis.

22. An apparatus in accordance with claim 14, wherein the at least one circular drive includes a first drive for providing the circular oscillation and a second drive for providing the circular feed.

* * * * *